US005327120A

United States Patent [19]

McKee et al.

[11] Patent Number: 5,327,120

[45] Date of Patent: Jul. 5, 1994

[54] STABILIZED ELECTROMAGNETIC RESONANT ARMATURE TACTILE VIBRATOR

[75] Inventors: John M. McKee, Hillsboro Beach; Charles W. Mooney, Lake Worth; Irving H. Holden; Gerald E. Brinkley, West Palm Beach, all of Fla.

[73] Assignee: Motorola, Inc., Schaumburg, Ill.

[21] Appl. No.: 909,261

[22] Filed: Jul. 6, 1992

[51] Int. Cl.[5] ............ H04Q 1/00

[52] U.S. Cl. ............ 340/825.460; 340/407.1; 310/29

[58] Field of Search ............ 340/825.46, 825.44, 340/407, 311.1, 407.1; 381/192, 193, 203; 128/36, 46, 49, 52; 310/21, 22, 29, 32, 33

[56] References Cited

U.S. PATENT DOCUMENTS

| | | | |
|---|---|---|---|
| 3,604,959 | 9/1971 | Sturman | 310/29 |
| 3,898,598 | 8/1975 | Asahi | 381/193 |
| 4,710,655 | 12/1987 | Masaki | 310/30 |
| 4,864,276 | 9/1989 | Tribbey et al. | 340/407 |
| 4,988,907 | 1/1991 | Irwin | 310/29 |
| 5,023,504 | 6/1991 | Mooney et al. | 310/322 |
| 5,107,540 | 4/1992 | Mooney et al. | 381/192 |

FOREIGN PATENT DOCUMENTS

3621133A1 1/1988 Fed. Rep. of Germany .

*Primary Examiner*—Donald J. Yusko
*Assistant Examiner*—Edwin C. Holloway, III
*Attorney, Agent, or Firm*—R. Louis Breeden; Thomas G. Berry

[57] ABSTRACT

A resonant armature system (109, 114, 116) for generating a vibrating motion in response to an alternating excitation force includes at least two planar suspension members (109), substantially parallel to each other and separated by a distance. The planar suspension member (109) includes a plurality of independent planar spring members (112) arranged regularly about a central planar region (110) within a planar perimeter region (108). The resonant armature system (109, 114, 116) further includes at least one movable mass (114) positioned between and coupled to the at least two planar suspension members (109) for resonating with the at least two planar suspension members (109) at a fundamental mode resonant frequency.

16 Claims, 3 Drawing Sheets

STABILIZED ELECTROMAGNETIC RESONANT ARMATURE TACTILE VIBRATOR

FIELD OF THE INVENTION

This invention relates in general to electromagnetic vibrators, and more specifically to electromagnetic vibrators comprising a resonant armature and used for generating a tactile alert in a portable communications receiver.

BACKGROUND OF THE INVENTION

Vibrators for generating tactile alerts in portable communications receivers are well known. Early devices comprised a motor driven offset mass for generating the tactile alert. Disadvantageously, such devices tended to have short lifetimes due to wear on bearings, commutators, brushes, etc. Also, when the portable communications receiver was worn on a person's body, the motor driven tactile vibrator generated movement not only in a direction useful for producing a tactile response, e.g., normal to the body, but also in other less useful directions, e.g., parallel to the body. As a result, such vibrators disadvantageously consumed large amounts of battery power for the amount of tactile response the vibrators produced.

As an improvement over the motor driven tactile vibrator, a resonant armature tactile vibrator has been developed that uses a movable mass suspended by a single planar spring suspension element and incorporates an axially polarized permanent magnet driven by an electromagnetic means to effect a vibration in a fundamental mode. This conventional resonant armature tactile vibrator overcomes many of the problems of the motor driven tactile vibrator, but has attendant limitations of its own. One such limitation is that, for mechanical clearance reasons during operation, the amount of vibrating mass that can be suspended by the planar spring suspension element for a given device volume is relatively small, thus requiring a relatively large device to produce a sufficiently strong tactile vibration. Another limitation is that the range of possible resonant frequencies is restricted by the thickness and displacement relationships of the single planar spring suspension element.

A further limitation to the performance of the conventional resonant armature tactile vibrator results from a critical coupling of the fundamental mode of vibration to other, spurious modes of vibration. The critical coupling exists because the design using a movable mass suspended by a single planar spring suspension element exhibits a torsional (second mode) resonant frequency that is very close to the resonant frequency of the fundamental mode. The second mode vibration that results from the critical coupling reduces the amplitude of the desired fundamental mode vibration and generates triaxial stresses in the suspension element, greatly reducing the life cycle yield before failure of the device.

Still another limitation of the conventional resonant armature device is caused by the axial polarization of the permanent magnet interacting with magnetic shielding required around the device for protection of sensitive circuits in portable communications receivers. This interaction further reduces the amplitude of the desired fundamental mode vibration.

Thus, what is needed is a vibrator that retains the advantages of the conventional resonant armature tactile vibrator over the motor driven tactile vibrator, but overcomes the limitations of the conventional resonant armature tactile vibrator. More specifically, a vibrator that provides a greater vibrating mass for producing a greater tactile response within a given device volume is needed. In addition, a vibrator that can be manufactured to operate over a wide range of predetermined resonant frequencies without reducing life cycle yield is desired. Also, a vibrator that can decouple the desired fundamental mode of vibration from energy-robbing, life-cycle-reducing spurious modes of vibration is highly desired. A vibrator that can be magnetically shielded without significant detrimental interaction between the magnetic shield and the vibrating elements is needed.

SUMMARY OF THE INVENTION

The present invention comprises a resonant armature system for generating a vibrating motion in response to an alternating excitation force. The resonant armature system comprises at least two planar suspension members, substantially parallel to each other and separated by a distance. The planar suspension member comprises a plurality of independent planar spring members arranged regularly about a central planar region within a planar perimeter region. The resonant armature system further comprises at least one movable mass positioned between and coupled to the at least two planar suspension members for resonating with the at least two planar suspension members at a fundamental mode resonant frequency.

DESCRIPTION OF A PREFERRED EMBODIMENT

Figure 1:
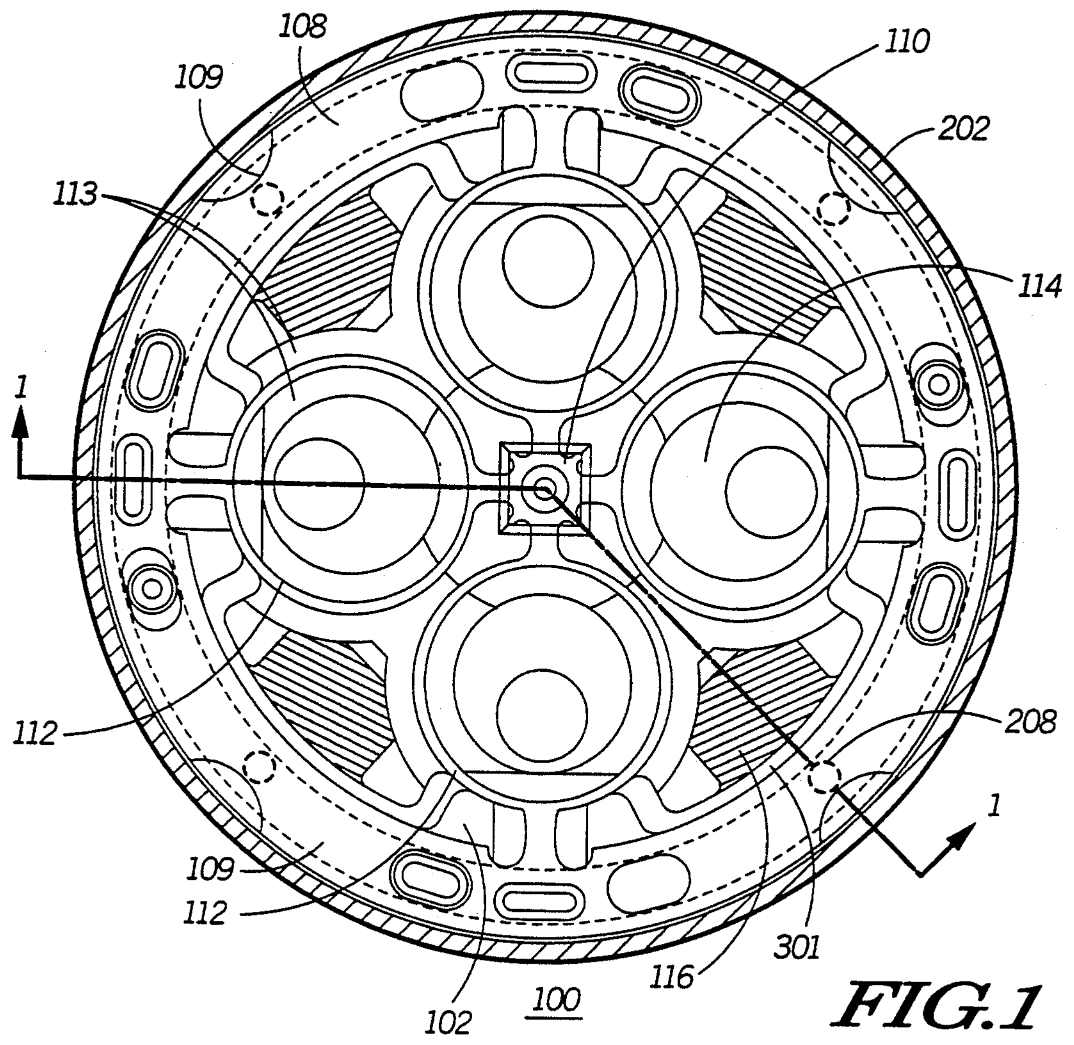
FIG. 1 is an orthogonal top view of a stabilized electromagnetic resonant armature tactile vibrator (with drive circuit and upper section of housing top removed) in accordance with a preferred embodiment of the present invention.

With reference to FIG. 1, an orthogonal top view of a stabilized electromagnetic resonant armature tactile vibrator 100 (with drive circuit and upper section of housing top removed) in accordance with a preferred embodiment of the present invention shows a coil form 102 approximately 0.7 inch (17.78 mm) in diameter for holding an electromagnetic coil 104 (FIG. 3) for generating an alternating magnetic field in response to an excitation signal. The coil form 102 establishes two planar perimeter seating surfaces for a planar perimeter region 108 of each of two planar suspension members 109. Each of the two planar suspension members 109 comprises four independent planar spring members 112 arranged orthogonally around a central planar region 110 for positioning and fastening the two planar suspension members 109 to a movable mass 114.

Figure 3:
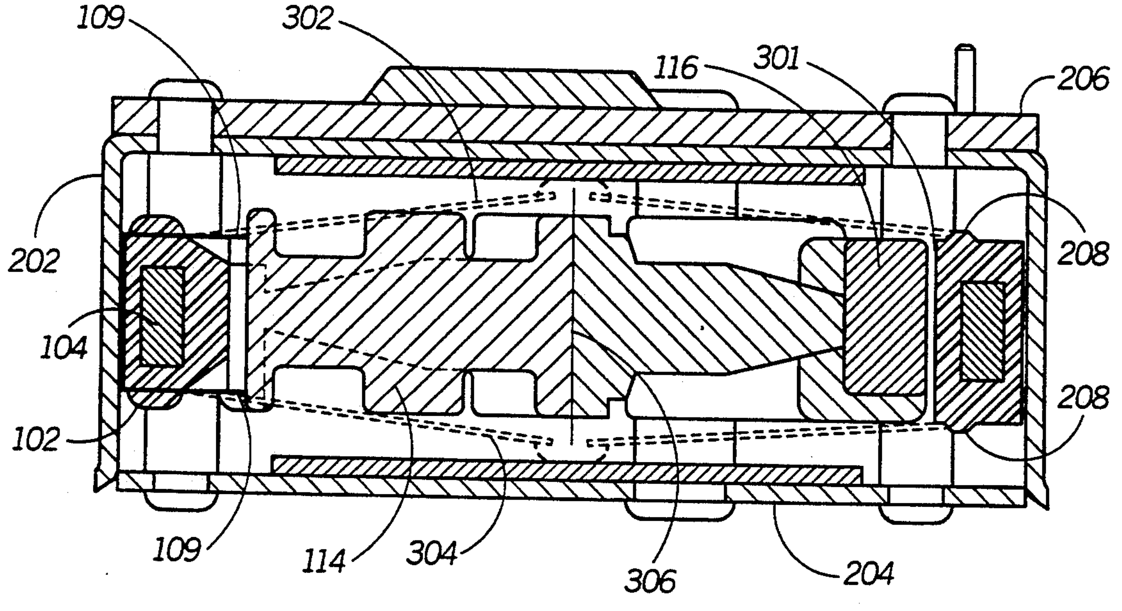
FIG. 3 is a cross-sectional view taken along the line 1—1 of FIG. 1 of the stabilized electromagnetic resonant armature tactile vibrator (including drive circuit and upper section of housing top) in accordance with the preferred embodiment of the present invention.

The arrangement of the parts of the vibrator 100 is such that the movable mass 114 can be displaced upwards and downwards in a direction normal to the planes of the two planar suspension members 109, the displacement being restricted by a restoring force provided by the independent planar spring members 112 in response to the displacement. The movable mass 114 is formed such that there are shaped channels 113 for allowing the movable mass 114 to extend through and around the independent planar spring members 112 during excursions of the movable mass 114 for providing a greater mass to volume ratio for the vibrator 100 than would be possible without the shaped channels 113. A driving force for the movable mass 114 is produced by four radially polarized permanent magnets 116 attached to the movable mass 114 and magnetically coupled to the electromagnetic coil 104 (FIG. 3). The two planar suspension members 109, the movable mass 114, and the four permanent magnets 116 comprise a resonant armature system for the vibrator 100.

For applications requiring a fundamental resonant frequency higher than that which can be achieved with the two planar suspension members 109 while remaining within desired fatigue lifetime parameters, the vibrator 100 can be manufactured using two layered stacks of the planar support members 109, each layered stack comprising two or more of the planar support members 109. By using the layered stacks it is possible to provide a higher spring rate and thus a higher resonant frequency while maintaining a low stress-strain limit for achieving the desired fatigue lifetime. In addition, the planar suspension members 109 comprise a nonlinear hardening spring system that provides increased amplitude and frequency compared to non-hardening spring systems for the same input power.

Measurements made on a prototype of the vibrator 100 have determined that, unlike a conventional resonant armature tactile vibrator, the vibrator 100 according to the present invention exhibits a second mode (torsional) resonant frequency that is advantageously much higher than the fundamental resonant frequency. The much higher second mode resonant frequency cannot easily couple with vibration at the fundamental resonant frequency, thus minimizing the generation of any power-robbing, stress-producing second mode vibration sympathetic to the fundamental mode vibration. The much higher torsional resonant frequency is accomplished in the vibrator 100 by separating the two planar support members 109 by a distance of approximately 0.1 inch (2.54 mm) to provide a greatly increased resistance to a torsional displacement, i.e., a twist, of the movable mass 114 compared to the resistance provided by a conventional resonant armature having a single planar support member attached to the center of a movable mass.

The reason for the greatly increased resistance to a torsional displacement in the vibrator 100 is that a torsional displacement in the vibrator 100 causes a relatively large linear displacement of the two planar support members 109. The displacement is in a direction parallel to the planes of the two planar support members 109. The displacement direction works against a spring constant that has been measured to be much higher than the spring constant in response to a torsional displacement in the conventional resonant armature. The much higher spring constant, combined with the leverage provided by the distance from the center of the movable mass 114 to the two planar support members 109 causes any torsional displacement of the movable mass 114 to be quickly and forcibly corrected, thus providing the much higher torsional mode resonant frequency.

For example, measurements on a representative conventional resonant armature tactile vibrator have determined a fundamental mode resonant frequency of sixty-eight Hz and a second mode resonant frequency of seventy-two Hz. With only four Hz separation between the two modes, the two modes are critically coupled, wherein the desired oscillations in the fundamental mode also cause high amplitude, undesired, destructive oscillations in the second (torsional) mode.

On the other hand, measurements made on a prototype of the vibrator 100 in accordance with the present invention have determined a fundamental mode resonant frequency of sixty-eight Hz and a second mode resonant frequency of two-hundred-fifty-three Hz. With so much separation between the resonant frequencies of the two modes, the undesirable second mode resonance is substantially decoupled from the desirable fundamental mode resonance. By effectively decoupling the second mode resonance from the fundamental mode resonance, power-robbing, stress-producing second mode vibration is minimized. The result is that the present invention produces a much more efficient vibrator having a much greater life cycle yield.

Figure 2:
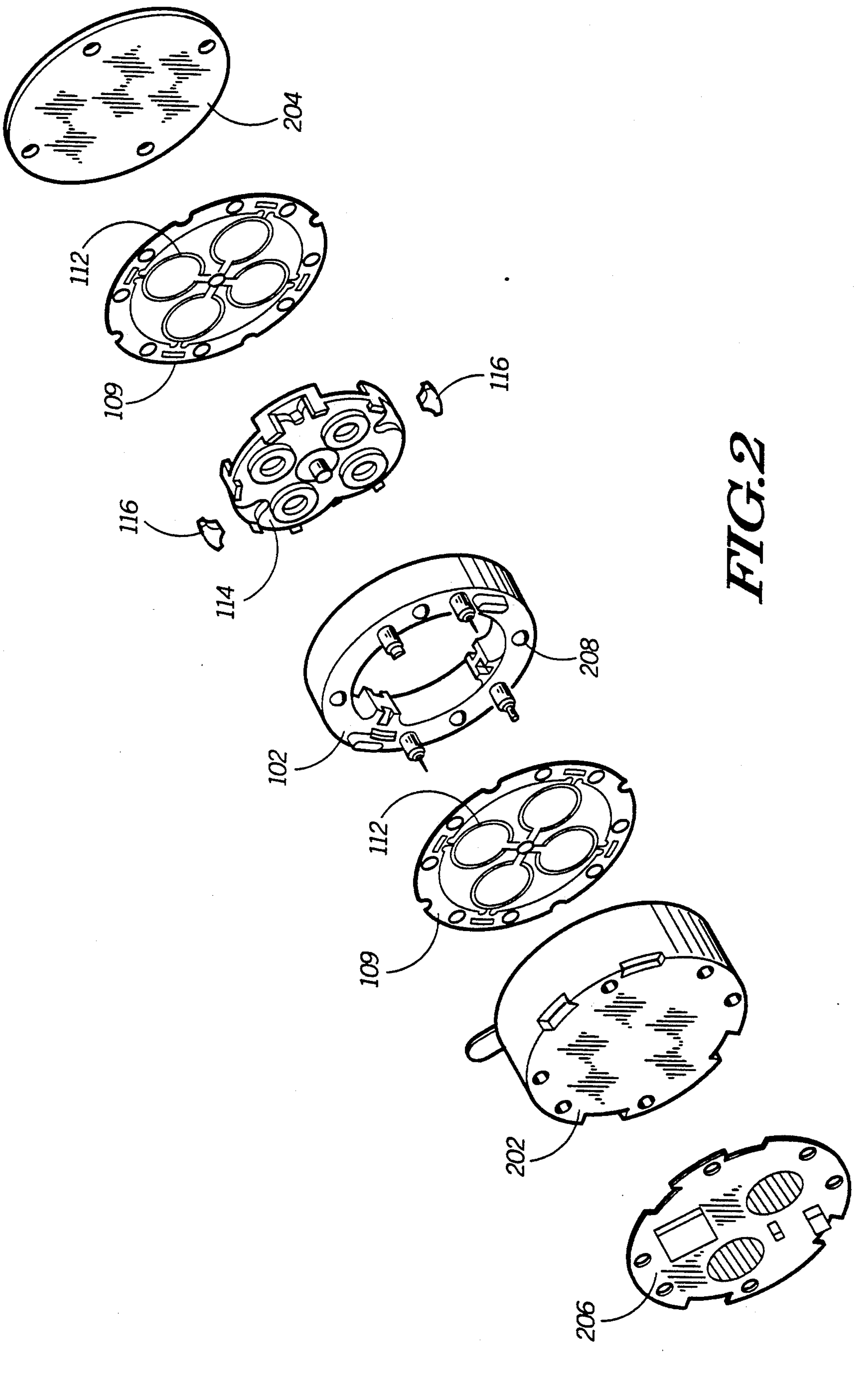
FIG. 2 is an exploded isometric view of the stabilized electromagnetic resonant armature tactile vibrator in accordance with the preferred embodiment of the present invention.

With reference to FIG. 2, an exploded isometric view of the stabilized electromagnetic resonant armature tactile vibrator 100 in accordance with the preferred embodiment of the present invention shows parts of the vibrator 100 (FIG. 1) described previously herein. In addition, the figure shows a housing top 202 and a housing bottom 204 for enclosing and supporting the vibrator 100, and for providing magnetic shielding for the vibrator 100. Also shown in FIG. 2 is a drive circuit 206 well understood by one of ordinary skill in the art for providing the excitation signal for the electromagnetic coil 104 (FIG. 3).

Because the permanent magnets 116 are radially polarized, i.e., polarized substantially parallel to the planes of the two planar suspension members, and because the displacement of the permanent magnets 116 during operation of the vibrator 100 (FIG. 1) is substantially normal to the polarization direction of the permanent magnets 116, any magnetic interaction between the permanent magnets 116 and the magnetically shielding housing top and bottom 202, 204 is advantageously minimized.

An additional detail shown in FIG. 2 comprises four protrusions 208 projecting in a direction normal to the top surface of the coil form 102 for mating with the planar perimeter region 108 of the top one of the two planar suspension members 109. The protrusions 208 are for pre-loading the planar perimeter region 108 after the planar perimeter region 108 is attached to the surface of the coil form 102 at attachment points located on either side of each of the protrusions 208. The purpose of the pre-loading is for preventing audible (high frequency) parasitic vibrations during operation of the vibrator 100. There also are four protrusions 208 on the bottom surface (not shown in FIG. 2) of the coil form 102 for pre-loading the planar perimeter region 108 of the bottom one of the two planar suspension members 109 in a similar manner.

With reference to FIG. 3, a cross-sectional view taken along the line 1—1 of FIG. 1 of the stabilized electromagnetic resonant armature tactile vibrator (including the drive circuit 206 and upper section of the housing top 202) in accordance with the preferred embodiment of the present invention clearly shows an air gap 301. The air gap 301 surrounds the movable mass 114 (partially shown), thus allowing the movable mass 114 to move in a direction normal to the planes of the two planar suspension members 109. Also shown are the top and bottom excursion limits 302, 304 for the two planar suspension members 109.

During operation, the electromagnetic coil 104 generates an alternating magnetic field polarized in a direction parallel to an axis 306 through the center of the resonant armature system 109, 114, 116 and having a frequency substantially the same as the fundamental resonant frequency of the resonant armature system 109, 114, 116. The alternating magnetic field is generated in response to an alternating excitation signal coupled to the electromagnetic coil 104. The alternating magnetic field is magnetically coupled to the four permanent magnets 116 that are physically coupled to the movable mass 114. These couplings produce an alternating excitation force on the resonant armature system 109, 114, 116, causing the resonant armature system 109, 114, 116 to vibrate at the fundamental resonant frequency with a displacement direction parallel to the axis 306. When the vibrator 100 is installed in a device, e.g., a selective call receiver, such that the vibrator 100 is oriented with the axis 306 normal to a user's body, a strong tactile response is advantageously generated with less power input to the vibrator 100 than would be required by conventional vibrators. This increase in efficiency is obtained because the vibrator 100 in accordance with the present invention overcomes many power wasting characteristics associated with earlier vibrator designs.

While the preferred embodiment according to the present invention uses the electromagnetic coil 104 interacting with the permanent magnets 116 for generating the alternating excitation force, other means, e.g., piezoelectric means, could be used for generating the alternating excitation force.

Materials preferable for construction of the vibrator 100 in accordance with the preferred embodiment of the present invention are as follows:

The coil form 102: Thirty-percent glass-filled liquid crystal polymer.

The planar suspension member 109: 17-7 PH heat treated CH900 precipitation-hardened stainless steel, 0.002 inch (0.0508 mm) thick, chemically machined.

The movable mass 114: Zamak 3 zinc die-cast alloy.

The permanent magnet 116: Samarium Cobalt 28-33 Maximum Energy Product; coercive force 8K-11K Oersteds.

The housing top and bottom 202, 204: Nickel-iron magnetic shielding alloy.

Figure 4:
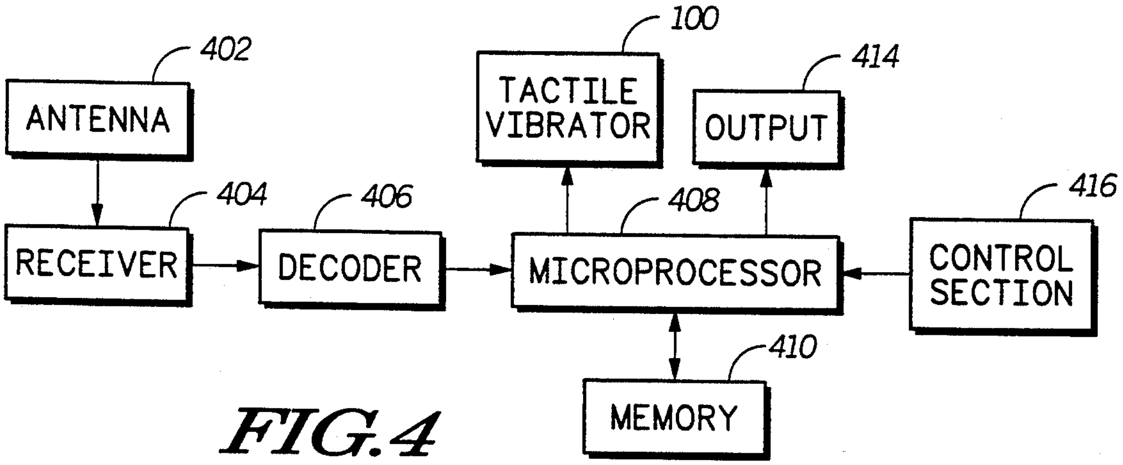
FIG. 4 is a block diagram of a selective call receiver comprising the stabilized electromagnetic resonant armature tactile vibrator in accordance with the preferred embodiment of the present invention.

With reference to FIG. 4, a block diagram of a selective call receiver comprising the stabilized electromagnetic resonant armature tactile vibrator 100 in accordance with the preferred embodiment of the present invention comprises an antenna 402 for accepting RF signals. The antenna 402 is coupled to a receiver 404 for receiving and demodulating the RF signals accepted. A decoder 406 is coupled to the receiver 404 for decoding demodulated information. A microprocessor 408 receives the decoded information from the decoder 406 and processes the information to recover messages. The microprocessor 408 is coupled to a memory 410 for storing the messages recovered, and the microprocessor 408 controls the storing and recalling of the messages. The tactile vibrator 100 in accordance with the present invention is coupled to the microprocessor 408 for providing a tactile alert to a user when the microprocessor 408 has a message ready for presentation.

There is an output device 414 comprising a visual display or a speaker or both, the output device 414 also being controlled by the microprocessor 408. Dependent upon an alert mode selected by a user, the speaker may also be used for generating an audible alert in response to receiving a message. A control section 416 comprises user accessible controls for allowing the user to command the microprocessor 408 to perform the selective call receiver operations well known to those skilled in the art and typically includes control switches such as an on/off control button, a function control, etc.

Thus, the present invention comprises a stabilized electromagnetic resonant armature tactile vibrator highly suitable for use in a portable communications receiver. The present invention further comprises a vibrator that retains the advantages of the conventional resonant armature tactile vibrator over the motor driven tactile vibrator, but overcomes the attendant limitations of the conventional resonant armature tactile vibrator. More specifically, the present invention comprises a vibrator that provides approximately a two-fold improvement over the existing art for the ratio of vibrating mass to device volume. A high mass to volume ratio is a measure of ability to miniaturize and is therefore of extreme importance in portable communications receivers, in which miniaturization is a key requirement.

The present invention further comprises a flexibly tunable vibrator that can be manufactured to operate over a wide range of predetermined resonant frequencies without reducing life cycle yield. Also, the present invention comprises an efficient, stabilized vibrator that advantageously decouples the desired fundamental mode of vibration from other, energy-robbing, life-cycle-reducing spurious modes of vibration. In addition, the present invention comprises a vibrator that can be magnetically shielded without significant detrimental interaction between the magnetic shield and the vibrating elements. The present invention makes it possible for a portable communications receiver having a tactile alert to be built with higher reliability, smaller size, and longer battery life than was previously possible.

We claim:

1. A resonant armature system for generating a tactile vibration in response to an alternating excitation force, the resonant armature system comprising:

at least two planar suspension members, substantially parallel to each other and separated by a distance, the at least two planar suspension members each comprising a plurality of independent planar spring members arranged regularly about a central planar region within a planar perimeter region; and a movable mass positioned between and coupled to the at least two planar suspension members for resonating with the at least two planar suspension members at a fundamental mode resonant frequency, wherein the movable mass includes shaped channels formed therein that enable portions of the movable mass to pass freely through apertures in the at least two planar suspension members during operation of the resonant armature system, thereby allowing a greater mass-to-volume ratio for the resonant armature system than would be possible without the shaped channels.

2. The resonant armature system in accordance with claim 1, wherein the at least two planar suspension members comprise a spring geometry such that a first restoring force in response to a linear displacement of the central planar region in a direction parallel to the planes of the at least two planar suspension members is substantially higher than a second restoring force in response to an equal linear displacement of the central planar region in a direction normal to the planes of the at least two planar suspension members.

3. The resonant armature system in accordance with claim 1, wherein the movable mass is attached to the central planar region of the at least two planar suspension members.

4. The resonant armature system in accordance with claim 1, wherein the independent planar spring members have a substantially rectangular cross-section having a width substantially greater than thickness.

5. The resonant armature system according to claim 1, wherein the alternating excitation force is generated by an alternating magnetic field.

6. The resonant armature system in accordance with claim 1, further comprising a plurality of radially polarized permanent magnets attached to the movable mass for magnetically coupling the movable mass to the alternating excitation force.

7. An apparatus for generating a tactile vibration in response to an excitation signal, the apparatus comprising:

a resonant armature system comprising:

at least two planar suspension members, substantially parallel to each other and separated by a distance, the at least two planar suspension members each comprising a plurality of independent planar spring members arranged regularly about a central planar region within a planar perimeter region;

a movable mass positioned between and coupled to the at least two planar suspension members for resonating with the at least two planar suspension members at a fundamental mode resonant frequency, wherein the movable mass includes shaped channels formed therein that enable portions of the movable mass to pass freely through apertures in the at least two planar suspension members during operation of the apparatus, thereby allowing a greater mass-to-volume ratio for the resonant armature system than would be possible without the shaped channels; and a plurality of radially polarized permanent magnets attached to the movable mass for generating an alternating excitation force to produce the tactile vibration in response to an alternating magnetic field; and electromagnetic means magnetically coupled to the plurality of radially polarized permanent magnets for generating the alternating magnetic field in response to the excitation signal.

8. The apparatus according to claim 7, further comprising a housing physically coupled to the electromagnetic means and to the resonant armature system for enclosing and supporting the electromagnetic means and the resonant armature system.

9. The apparatus in accordance with claim 7, wherein the electromagnetic means comprises a single electromagnetic coil.

10. The apparatus in accordance with claim 7, wherein the electromagnetic means is physically attached to the planar perimeter region of the at least two planar suspension members by an attachment means comprising a plurality of attachment points.

11. The apparatus in accordance with claim 10, wherein the attachment means further comprises a plurality of protrusions projecting from the electromagnetic means in a direction normal to the plane of the planar perimeter region, each of the plurality of protrusions being between two of the plurality of attachment points.

12. An electromagnetic resonant vibrator, comprising:

a resonant armature system comprising:

at least two planar suspension members, substantially parallel to each other and separated by a distance, the at least two planar suspension members each comprising a plurality of independent planar spring members arranged regularly about a central planar region within a planar perimeter region;

a movable mass positioned between and coupled to the at least two planar suspension members for resonating with the at least two planar suspension members at a fundamental mode resonant frequency, wherein the movable mass includes shaped channels formed therein that enable portions of the movable mass to pass freely through apertures in the at least two planar suspension members during operation of the electromagnetic resonant vibrator, thereby allowing a greater mass-to-volume ratio for the resonant armature system than would be possible without the shaped channels; and a plurality of radially polarized permanent magnets attached to the movable mass for generating an alternating excitation force to produce a tactile vibration in response to an alternating magnetic field;

an electromagnet magnetically coupled to the plurality of radially polarized permanent magnet for generating the alternating magnetic field in response to an excitation signal; and a housing physically coupled to the electromagnet and to the resonant armature system for enclosing and supporting the electromagnet and the resonant armature system.

13. The electromagnetic resonant vibrator according to claim 12, wherein the at least two planar suspension members comprise a spring geometry such that a first restoring force in response to a linear displacement of the central planar region in a direction parallel to the planes of the at least two planar suspension members is substantially higher than a second restoring force in response to an equal linear displacement of the central planar region in a direction normal to the planes of the at least two planar suspension members.

14. The electromagnetic resonant vibrator according to claim 12, wherein the electromagnet is physically attached to the planar circular perimeter region of the at least two planar suspension members by an attachment means comprising a plurality of attachment points, and wherein the attachment means further comprises a plurality of protrusions projecting from the electromagnet in a direction normal to the plane of the planar circular perimeter region, each of the plurality of protrusions being between two of the plurality of attachment points.

15. A selective call receiver comprising a receiver for receiving radio frequency (RF) signals comprising information and for demodulating the RF signals to derive the information;

a decoder coupled to the receiver for decoding the received information and obtaining messages therefrom;

a processor coupled to the decoder for accepting the messages and for generating an alert signal in response thereto; and an alert device coupled to the processor for generating a vibrating tactile alert in response to the alert signal, the alert device comprising:

a resonant armature system comprising:

at least two planar suspension members, substantially parallel to each other and separated by a distance, the at least two planar suspension members each comprising a plurality of independent planar spring members arranged regularly about a central planar region within a planar perimeter region; and a movable mass positioned between and coupled to the at least two planar suspension members for resonating with the at least two planar suspension members at a fundamental mode resonant frequency, wherein the movable mass includes shaped channels formed therein that enable portions of the movable mass to pass freely through apertures in the at least two planar suspension members during operation of the alert device, thereby allowing a greater mass-to-volume ratio for the resonant armature system than would be possible without the shaped channels.

16. The selective call receiver in accordance with claim 15, wherein the resonant armature system further comprises a plurality of radially polarized permanent magnets attached to the movable mass for generating an alternating excitation force to produce the vibrating tactile alert in response to an alternating magnetic field, and wherein the alert device further comprises:

an electromagnet magnetically coupled to the plurality of radially polarized permanent magnets for generating the alternating magnetic field in response to an excitation signal;

a drive circuit coupled to the electromagnet and to the processor for providing the excitation signal for the electromagnet in response to the alert signal; and a housing physically coupled to the electromagnet, the drive circuit, and the resonant armature system for enclosing, supporting, and magnetically shielding the electromagnet, the drive circuit, and the resonant armature system.

* * * * *

UNITED STATES PATENT AND TRADEMARK OFFICE

CERTIFICATE OF CORRECTION

PATENT NO. : 5,327,120

DATED : July 5, 1994

INVENTOR(S) : McKee et al.

It is certified that error appears in the above-indentified patent and that said Letters Patent is hereby corrected as shown below:

Column 8, line 42, after "permanent" delete "magnet" and insert --magnet:

Signed and Sealed this

Third Day of January, 1995

Attest:

BRUCE LEHMAN

Attesting Officer

Commissioner of Patents and Trademarks